US006986285B2

(12) United States Patent
Avisse (10) Patent No.: US 6,986,285 B2
(45) Date of Patent: Jan. 17, 2006

(54) PRESSURE SENSOR AND A ROCKET ENGINE INCORPORATING IT

(75) Inventor: Jean-Bernard Avisse, Castelneau de Medoc (FR)

(73) Assignee: Snecma Propulsion Solide, Le Haillan (FR)

( * ) Notice: Subject to any disclaimer, the term of this patent is extended or adjusted under 35 U.S.C. 154(b) by 0 days.

(21) Appl. No.: 10/466,563

(22) PCT Filed: Jan. 29, 2002

(86) PCT No.: PCT/FR02/00340

§ 371 (c)(1),
(2), (4) Date: Jul. 16, 2003

(87) PCT Pub. No.: WO02/061384

PCT Pub. Date: Aug. 8, 2002

(65) Prior Publication Data
US 2004/0089074 A1 May 13, 2004

(30) Foreign Application Priority Data
Jan. 31, 2001 (FR) .................................. 01 01285

(51) Int. Cl.
*G01L 9/04* (2006.01)
(52) U.S. Cl. ...................................................... 73/726
(58) Field of Classification Search ................ 73/726, 73/720, 700; 338/42, 4, 5
See application file for complete search history.

(56) References Cited

U.S. PATENT DOCUMENTS

| 4,295,116 | A | * | 10/1981 | Studlien ........................ 338/4 |
| 4,671,593 | A | | 6/1987 | Millon-Fremillon et al. |
| 5,892,860 | A | * | 4/1999 | Maron et al. ................. 385/12 |
| 6,045,396 | A | | 4/2000 | Tighe |
| 6,372,589 | B1 | * | 4/2002 | Yu ............................. 438/304 |
| 2004/0135666 | A1 | * | 7/2004 | Kurtz et al. .................. 338/42 |

FOREIGN PATENT DOCUMENTS

JP 63 122925 A 5/1988

* cited by examiner

*Primary Examiner*—Edward Lefkowitz
*Assistant Examiner*—Andre Allen
(74) *Attorney, Agent, or Firm*—Weingarten, Schurgin, Gagnebin & Lebovici LLP (57) ABSTRACT

The pressure sensor (2) comprises a pressure detector element (21) arranged to receive a pressure that is to be measured and to detect it, and a printed circuit (22) connected to the pressure detector element (21) via an electrical connection, and it is characterized in that the electrical connection comprises at least one flexible conductive tongue (29) having a first end (290) connected directly or indirectly to the printed circuit (22) and a second end (291) merely bearing against a corresponding electrical contact (213a) of the pressure detector element (21). In order to ensure good electrical contact, the bearing face (294) of the second end of the or each flexible conductive tongue (29) bearing against the corresponding electrical contact (213a) is polished.

38 Claims, 7 Drawing Sheets

PRESSURE SENSOR AND A ROCKET ENGINE INCORPORATING IT

FIELD OF THE INVENTION

The present invention relates to a pressure sensor, e.g. used to measure fluid pressures in a rocket engine, and also to a rocket engine incorporating the sensor.

DESCRIPTION OF THE PRIOR ART

While a rocket engine is operating, it is known to monitor the pressure of the fluid propellants flowing in the engine by using pressure sensors, in order to detect anomalies, if any.

Figure 1:
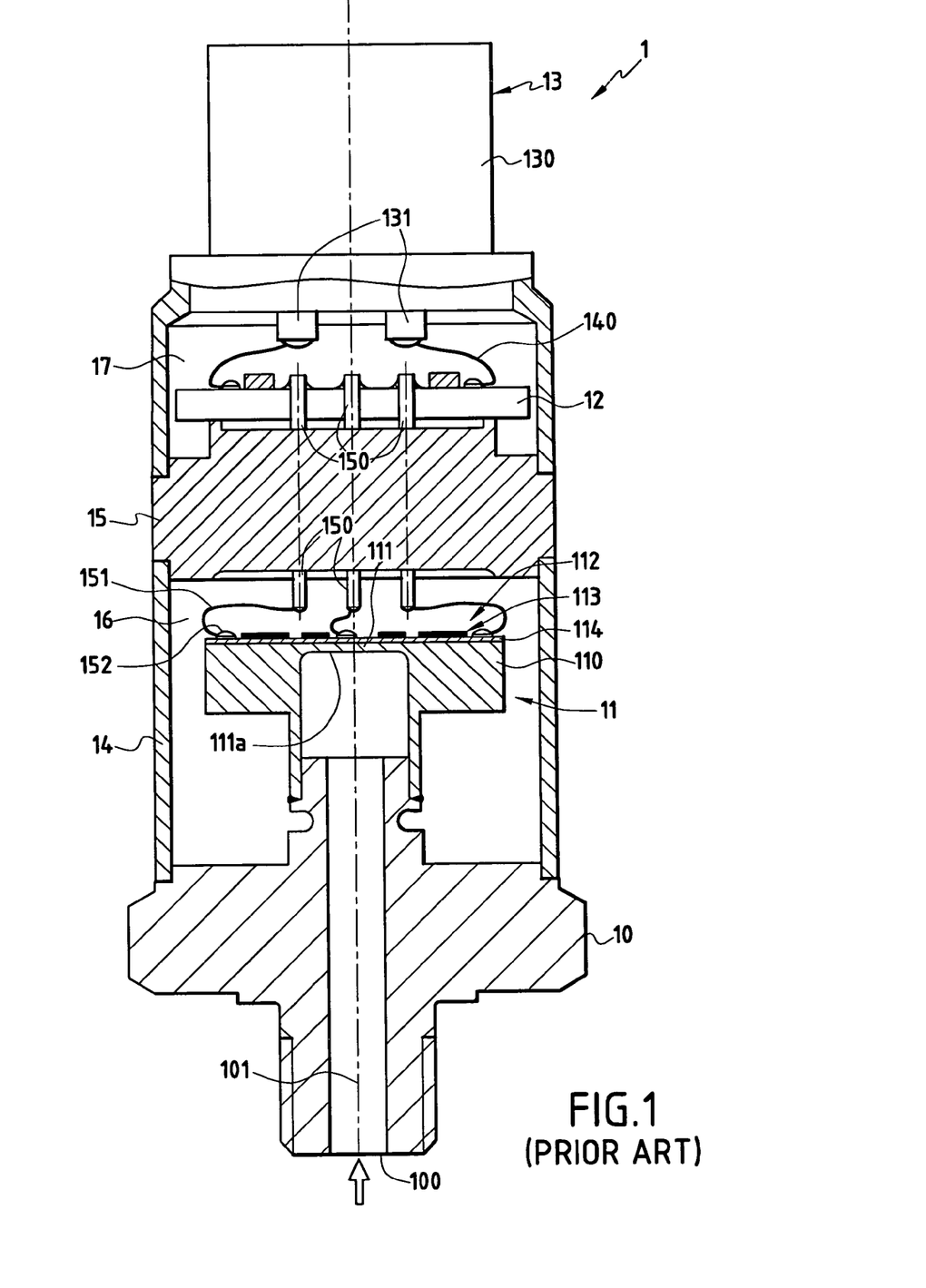
FIG. 1, described above, shows a prior art pressure sensor.

FIG. 1 shows a prior art pressure sensor suitable for such an application. The pressure sensor of FIG. 1, given overall reference 1, comprises a pressure-takeoff body 10 have a pressure detector element 11 mounted thereon. The pressure detector element 11 comprises a support piece 110 having a central portion defining a deformable membrane 111 and supporting a strain-gauge circuit 112. The deformable membrane 111 is arranged so that one of its faces, 111a, communicates with a fluid inlet 100 of the pressure-takeoff body 10 via a duct 101.

The strain gauges of the circuit 112 generally constitute extensometric electrical resistors, i.e. electrical conductors whose resistance varies when they are deformed. The strain-gauge circuit 112 is constituted by an etched metal film 113 and an insulating substrate 114 which supports the etched film 113 and itself rests on the support piece 110.

A printed circuit 12 carrying electrical components for amplification and/or adjustment purposes is electrically connected to the strain-gauge circuit 112.

An electrical connector 13 comprising a body 130 and conductive pins 131 connected to the printed circuit 12 via conductive wires 140 enables the sensor to be connected to an external electronic system (not shown) for collecting data.

The pressure sensor 1 also has a protective body 14 and an internal hermetic sealing plate 15 which co-operates with the pressure-takeoff body 10 to define a vacuum chamber 16 containing the pressure detector element 11 with its strain gauges. The hermetic sealing plate 15 separates and isolates the vacuum chamber 16 from a second chamber 17 containing the printed circuit 12. The electrical connection between the printed circuit 12 and the strain-gauge circuit 112 is provided by means of conductive pins 150 passing through the hermetic sealing plate 15 and by means of electric wires 151 which are fixed each at one end to the pins 150 and at the other end to the strain-gauge circuit 112. More particularly, one end of each wire 151 is attached via a weld or solder joint 152 to an inlet or outlet tab of the strain-gauge circuit 112.

The pressure-takeoff body 10, the protection body 14, the body 130 of the connector 13, and the support piece 110 are generally made of stainless steel.

The pressure sensor as shown in FIG. 1 is an absolute sensor. It measures the pressure of a fluid relative to vacuum pressure. Other pressure sensors are referred to as "relative" sensors and they measure pressure by using atmospheric pressure as a reference. With relative sensors, the hermetic sealing plate is omitted, the pressure detector element and the printed circuit being disposed in a common chamber that is subjected to atmospheric pressure.

The pressure sensor 1 operates as follows:

A fluid whose pressure is to be measured penetrates into the duct 101 of the pressure-takeoff body 10 via the inlet 100 and comes into contact with the surface 111a of the membrane 111. The pressure of the fluid causes the membrane 111 to be deflected, thereby also deforming a portion of the strain-gauge circuit 112 which is disposed securely on the support piece 110. The electrical resistance of the strain gauges is thus modified. By applying a feed voltage to the strain-gauge circuit 112 via the printed circuit 12, a voltage is obtained at the output tabs of the strain-gauge circuit that is representative of the pressure difference between the face 111a of the membrane 111 and the top face of the strain-gauge circuit 112.

The signal picked up from the output tabs passes via the wires 151 and the pins 150 to the printed circuit 12 where it is corrected and possibly also amplified. Signal correction seeks to compensate for certain defects that can appear during manufacture of the sensor, which defects tend to offset the signal relative to one or more reference values, or else to cause it to drift. The corrected and possibly amplified signal that is produced by the printed circuit 12 can be forwarded to the above-mentioned data collecting system via the electrical connector 13.

The pressure sensor 1 presents the drawback of being relatively expensive to manufacture. In particular, it requires difficult operations of welding or soldering the conductive wires 151 to the pressure detector element 11 without damaging the strain-gauge circuit 112 or the membrane 111. In this respect, it should be observed that the layers 113, 114 forming the strain-gauge circuit 112 are very thin and thus relatively fragile, such that great care needs to be applied while welding or soldering in order to avoid possible damage.

The operations of welding or soldering conductive wires 151 to the pressure detector element 11 are particularly critical when the sensor is for use in an environment having a high level of vibration. It is then necessary to fix the conductive wires 151 to the strain-gauge circuit 112 in such a manner that said wires can support the vibration that occurs when the sensor is in operation. This work is technically possible, but it significantly increases the cost of the sensor.

Furthermore, as an absolute pressure sensor, the pressure sensor 1 shown in FIG. 1 is complicated and expensive to manufacture in that it requires two distinct chambers 16 and 17 to be made, together with a hermetic sealing plate 15 for isolating them. The plate 15 must also have conductive pins 150 passing through it in hermetically sealed manner, and that increases the difficulty.

Another drawback of the pressure sensor 1 lies in the fact that it is poorly suited to measuring pressure in cryogenic fluids. Unfortunately, most rocket engines use propellants such as liquid oxygen and liquid hydrogen, which, by their very nature, are fluids that are very cold. The stainless steel in which the pressure sensor 1 is made is then unsuitable for receiving such fluids directly, since that material presents very poor thermal conductivity. On coming into contact with a cryogenic fluid, stainless steel is subject to thermal shock which can be damaging to the sensor, in particular to the sensing portion thereof which comprises the membrane 111 and the strain gauges of the circuit 112. In addition, the membrane 111 which supports the strain-gauge circuit 112 is not capable rapidly of matching the temperatures of the various strain gauges once the pressure to be measured has been received. Depending on their positions on the pressure detector element 11, the strain gauges are not all at the same temperature at the moment pressure is measured. This leads to the strain-gauge circuit being unbalanced, which greatly reduces the effectiveness and the reliability of the sensor since it falsifies the measurement.

Figure 2:
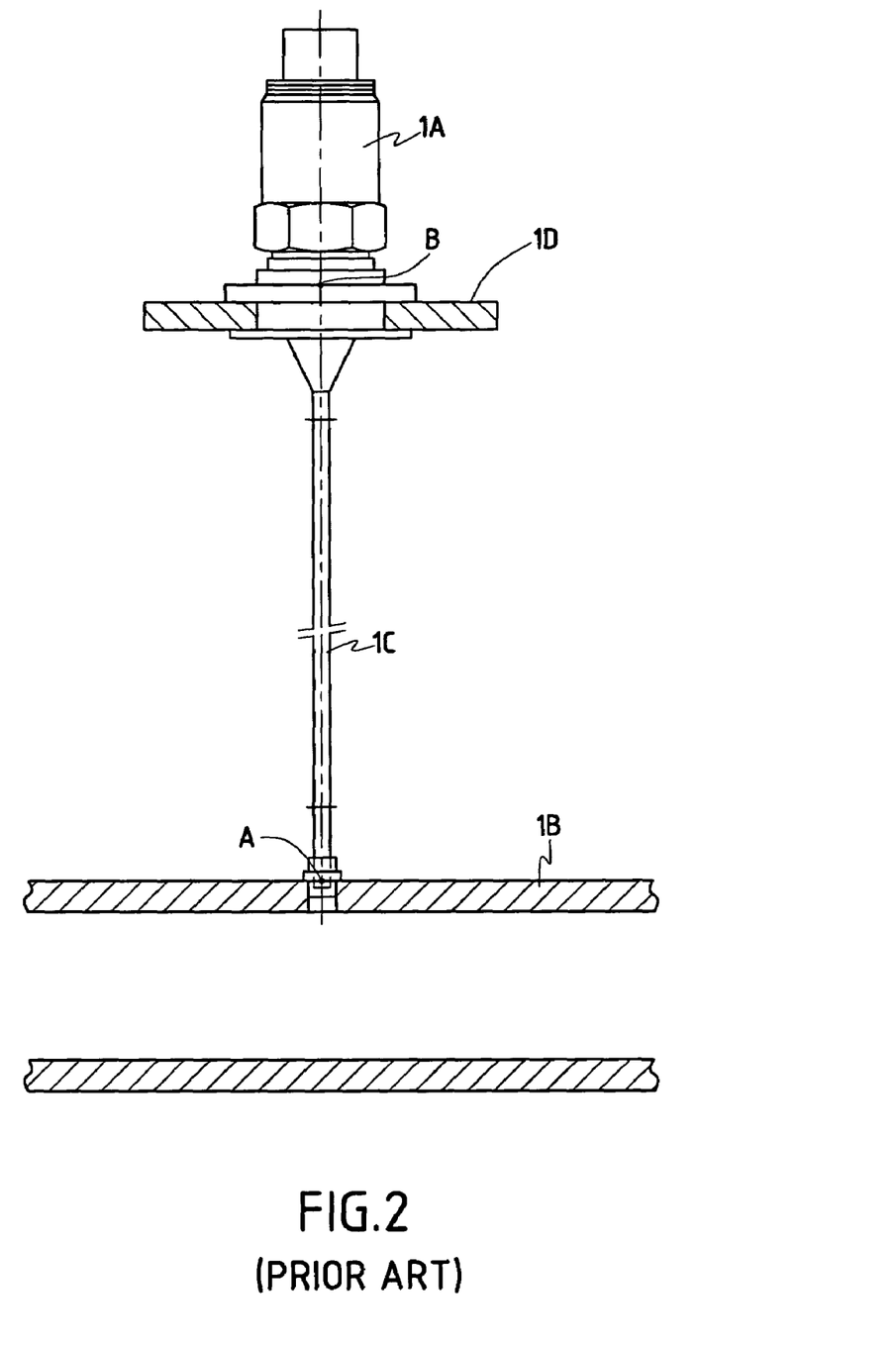
FIG. 2, described above, is a diagram showing a prior art pressure sensor connected to a portion of a rocket engine.

To solve those problems, it is well known to connect the pressure sensor to the rocket engine by means of a long pipe, which conveys a fraction of the propellants from the engine to the sensor. On reaching the pressure sensor, the propellants are no longer at cryogenic temperature since they have been warmed up, in particular as they travel along the pipe. FIG. 2 is a diagram of a pressure sensor 1A connected to a rocket engine 1B by a pipe 1C in which a propellant flows. The pressure sensor 1A is mounted on a support plate 1D that includes thermal decoupling devices. At the end of the pipe that is connected to the engine (marked A), the propellant is at cryogenic temperature. At the inlet to the pressure sensor (reference B), the temperature is higher, about −40° C., or even higher.

That solution for measuring the pressure of cryogenic propellants is not satisfactory since it requires the use of numerous long pipes (one pipe for each pressure sensor used by the engine), thereby complicating the overall structure and leading to considerable manufacturing and inspection costs, as well as to a lack of reliability.

OBJECTS AND BRIEF SUMMARY OF THE INVENTION

A first object of the present invention consists in devising a pressure sensor at reduced cost.

In a first aspect of the invention, this object is achieved by a pressure sensor comprising a pressure detector element arranged to receive a pressure that is to be measured and to detect it, and a printed circuit connected to the pressure detector element by an electrical connection, the sensor being characterized in that said electrical connection comprises at least one flexible conductive tongue having a first end connected to the printed circuit and a second end merely bearing against a corresponding electrical contact of the pressure detector element, and in that the bearing face of said second end bearing against the corresponding electrical contact is polished.

Thus, the conductive wires and the weld joints used in the prior art for connecting the printed circuit to the pressure detector element are replaced in the invention by flexible conductive tongues that merely press against electrical contacts of the pressure detector element without being fixed thereto. This makes assembly of the sensor easier. In spite of the absence of a secure connection between the second end of each flexible conductive tongue and the pressure detector element, good electrical contact is obtained because the bearing face of said second end is polished.

The pressure detector element of the invention detects the received pressure, e.g. by modifying an electrical value, such as a resistance, in one or more electrical components of the pressure detector element.

The flexible conductive tongue(s) of the invention can serve to feed the pressure detector element electrically from the printed circuit and/or to transmit an electrical pressure detection signal to the printed circuit from the pressure detector element. In a variant, the flexible conductive tongues may optionally serve not only for the purposes specified above, but also to convey to the printed circuit an electrical signal produced by one or more temperature probes situated on the pressure detector element.

Advantageously, the electrical contact(s) is/are positioned on the pressure detector element at a location which is relatively insensitive to the pressure that is to be measured. Consequently, they remain substantially stationary relative to the sensor assembly, such that, when a pressure for measurement is applied to the pressure detector element, the bearing ends of the corresponding tongues do not move at all, or move very little. The flexibility of the tongues thus serves mainly to compensate for assembly tolerances during assembly of the sensor, and also for thermal expansion differences between the various elements of the sensor while it is in operation.

Typically, the pressure detector element comprises a membrane arranged to receive the pressure that is to be measured on a first face and to deflect under the effect of said pressure, and at least one strain gauge which is situated on a second face of the membrane opposite from the first face so as to deflect with the membrane under the effect of said pressure and which is connected to the electrical contact(s).

The pressure detector element may also comprise a support having a thin central portion constituting the membrane, and a rigid periphery, the or each electrical contact being preferably disposed on the rigid periphery at a sufficient distance from the membrane to be relatively insensitive to the pressure that is to be measured.

In order to make the connection between the pressure detector element and the printed circuit disconnectable, the first end of the or each flexible conductive tongue may merely be engaged on a first end of a corresponding conductive pin having a second end connected to the printed circuit.

In a first embodiment of the invention, the pressure sensor comprises an evacuated first chamber in which the pressure detector element is disposed and a second chamber containing the printed circuit. Between the first and second chambers, there is also provided a hermetic sealing plate having at least one conductive element passing through it and connected at a first end to the or one of the flexible conductive tongues, and at a second end to the printed circuit. By way of example, the conductive element is constituted by the above-mentioned conductive pin.

In a second embodiment of the invention, the pressure detector element and the printed circuit are disposed in a common chamber inside the pressure sensor. This common chamber is evacuated if it is desired for the sensor of the invention to act as an absolute sensor. In this second embodiment, the electrical component(s) of the printed circuit is/are preferably situated on a face facing the pressure detector element. In addition, the or each flexible conductive tongue may be connected to the printed circuit either by fixing its first end directly to the printed circuit, or else, as mentioned above, by engaging said first end on a first end of a corresponding conductive pin having a second end connected to the printed circuit.

The pressure sensor of the invention may include an electrical connector enabling an electrical appliance to be connected to the sensor and having at least one conductive pin with one end connected to the printed circuit by engaging in a corresponding connection sleeve.

Typically, the pressure sensor comprises a body in which the pressure detector element and the printed circuit are fixed, which body has an opening enabling a fluid whose pressure is to be measured to enter into the sensor.

Advantageously, the flexible conductive tongue(s) of the invention are made of beryllium-copper. Beryllium-copper provides good electrical contact and facilitates the machining and shaping of the tongues during manufacture of the sensor. It also presents very good mechanical characteristics.

A second object of the invention consists in devising an absolute pressure sensor at reduced cost.

In a second aspect of the invention, this object is achieved by an absolute pressure sensor comprising a body, a pressure detector element, and a printed circuit electrically connected to the pressure detector element, the sensor being characterized in that the pressure detector element and the printed circuit are disposed in a common vacuum chamber inside the body.

Thus, the specific chamber used in the prior art for housing the printed circuit and the hermetic sealing plate for isolating said chamber from another chamber containing the pressure detector element are omitted. Providing a single chamber for the pressure detector element and the printed circuit in accordance with the invention serves to simplify the structure of the sensor and to reduce its size. In addition to its advantage in terms of cost, the absolute pressure sensor in this second aspect of the invention presents the advantage of withstanding external vibration better since it is made up of a smaller number of parts.

A third object of the present invention consists in devising a pressure sensor that is better adapted to measuring the pressure of cryogenic fluids.

In a third aspect of the invention, this object is achieved by a pressure sensor characterized in that it is made, at least in part, out of beryllium-copper.

Beryllium-copper presents good behavior in a temperature range extending from about −260° C. to about +150° C. and in a pressure range extending up to about 500 bars. This material thus enables pressure sensors to be made for placing under extreme conditions of temperature and pressure and capable, in particular, of receiving cryogenic fluids, i.e. fluids at a temperature of less than about −100° C., or even less than about −150° C.

In addition, unlike stainless steel as used in the prior art, beryllium-copper possesses very good thermal conductivity, thus reducing the risk of thermal shock in the sensor.

Furthermore, beryllium-copper is not attacked by liquid oxygen or by liquid hydrogen which are cryogenic fluids that are often used as propellants in rocket engines, such that the pressure sensor in this third aspect of the invention presents a particular advantage when measuring the pressure of such propellants.

The pressure sensor of this third aspect of the invention typically includes a membrane arranged to receive on one face a fluid whose pressure is to be measured and to deflect under the effect of said pressure, and at least one strain gauge placed on a second face of the membrane, opposite from the first, so as to deflect with the membrane under the effect of said pressure. The membrane is advantageously made of beryllium-copper.

The very good thermal conductivity of beryllium-copper enables the sensing portion of the sensor, comprising the membrane and the strain gauge(s) to reach the temperature of the fluid very quickly when the fluid comes into contact with the first face of the membrane. It also guarantees that the temperature of the strain gauge(s) becomes uniform very quickly so that pressure measurements are disturbed little or not at all by undesirable temperature differences on said strain gauge(s). Furthermore, beryllium-copper confers good mechanical properties to the membrane.

More precisely, the pressure sensor in this third aspect of the invention may include a support comprising a thin central portion and a rigid periphery, the thin central portion acting as a membrane arranged for receiving a fluid whose pressure is to be measured on one of its faces and to deflect under the effect of said pressure, together with a strain-gauge circuit placed on the support in such a manner that at least one strain gauge of the strain-gauge circuit is deformed together with the membrane under the effect of said pressure. The support is advantageously made of beryllium-copper.

The pressure sensor may also include a body in which the support and the strain-gauge circuit are disposed, the body having an opening allowing the fluid to enter into the pressure sensor. Advantageously, at least a portion of the body for coming into contact with the fluid is made of beryllium-copper.

More specifically, the pressure sensor may comprise a pressure-takeoff body secured to the support and having a duct formed therein suitable for receiving the fluid and directing it to the support. The pressure-takeoff body is advantageously made of beryllium-copper.

In order to further increase the ability of the pressure sensor in this third aspect of the invention to withstand thermal shock, the fluid feed means constituted by the above-mentioned pressure-takeoff body and duct may be arranged to direct the fluid whose pressure is to be measured essentially towards a surface of the rigid periphery of the support, together with communication means putting said surface of the rigid periphery into communication with said face of the membrane so as to enable the fluid subsequently to come into contact with said face of the membrane. The communication means may typically comprise an empty space situated between the support and the fluid feed means.

Thus, by forming an indirect path for the fluid leading towards the sensing portion (membrane and strain-gauge circuit) of the pressure sensor, the fluid feed means and the communication means prevent said fluid coming suddenly into contact with said sensing portion. Temperature diffusion occurs within the support as soon as the fluid comes into contact with the rigid periphery, such that the temperature of the sensing portion is already close to that of the fluid before the fluid reaches the sensing portion.

In practice, in order to obtain this temperature diffusion effect, the pressure-takeoff body may include a projection entering into a recess of the support defined by the rigid periphery and the membrane, and the duct may have a first hole with an open end for receiving the fluid and a closed end, and a second hole communicating with the first hole at or close to its closed end and making an angle with the first hole, the second hole being formed at least in part in the projection and opening out into the empty space essentially going towards said surface of the rigid periphery of the support.

A fourth object of the present invention consists in devising a simplified rocket engine.

In a fourth aspect of the invention, this object is achieved by a rocket engine designed to use one or more cryogenic fluid propellants such as liquid oxygen or liquid hydrogen, the engine being characterized in that it includes at least one pressure sensor for measuring the pressure of at least one cryogenic fluid propellant, and in that said at least one pressure sensor is arranged so that on receiving said at least one cryogenic fluid propellant the propellant is still at cryogenic temperature.

Typically, the pressure sensor(s) is/are mounted inside the rocket engine or directly on a wall of the rocket engine.

Thus, the rocket engine of the invention does not require the use of complicated duct systems as in the prior art in order to offset the pressure sensor(s) far from the engine.

In this fourth aspect of the invention, the or each pressure sensor may comprise a pressure detector element and a printed circuit interconnected via at least one flexible conductive tongue having a first end connected to the printed circuit and a second end merely bearing against a corresponding electrical contact of the pressure detector element. Under such circumstances, the or each flexible conductive tongue preferably has a resonant frequency of not less than about 12 kilohertz (kHz) so as to enable it to withstand engine vibration well.

In a variant, it is possible to connect the pressure detector element to the printed circuit by means of at least one electric wire with respective ends fixed, e.g. by welding or soldering, respectively to the pressure detection element and to the printed circuit.

DETAILED DESCRIPTION OF EMBODIMENTS OF THE INVENTION

Figure 3:
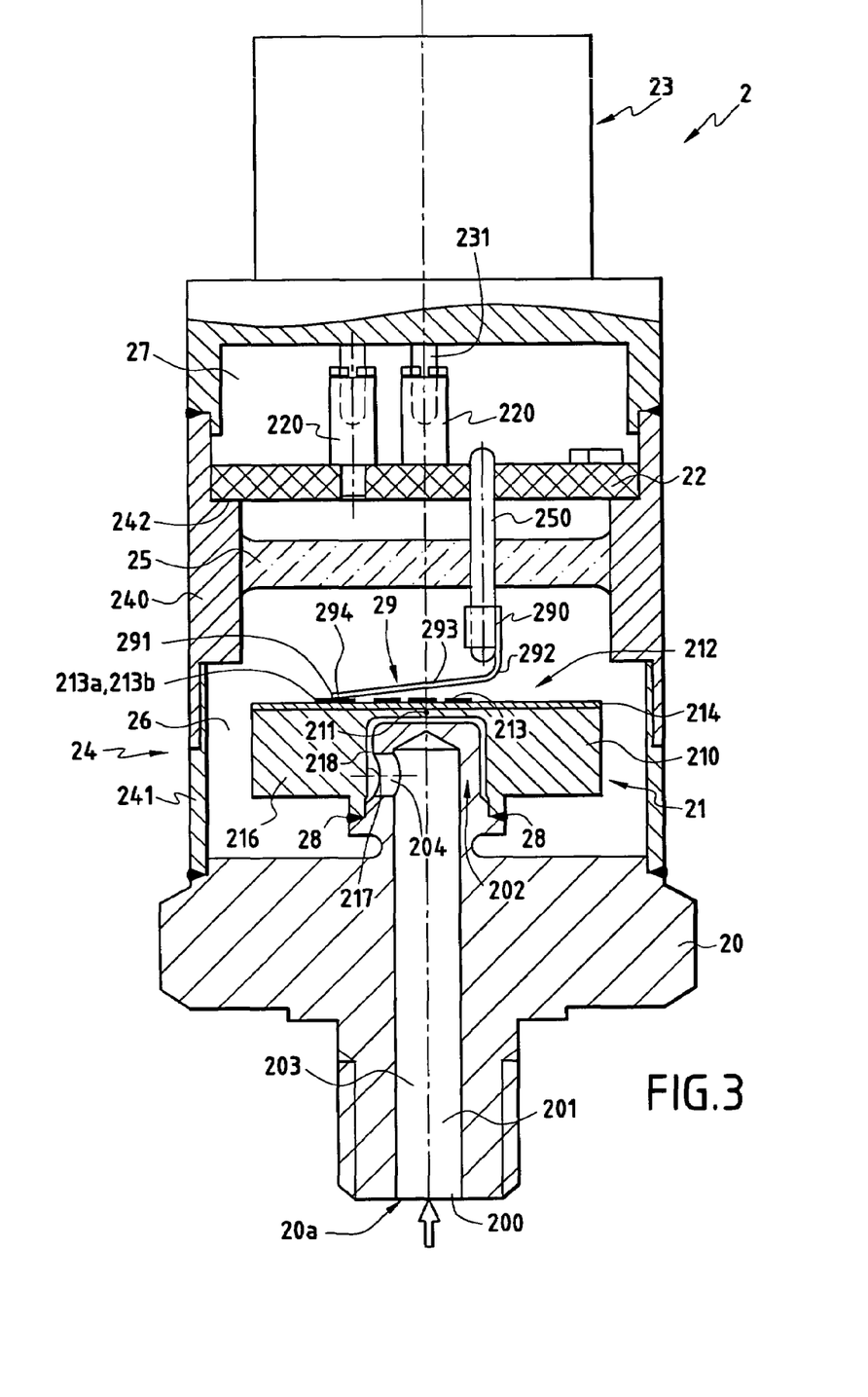
FIG. 3 is a fragmentary section view of a pressure sensor constituting a first embodiment of the present invention.
Figure 4:
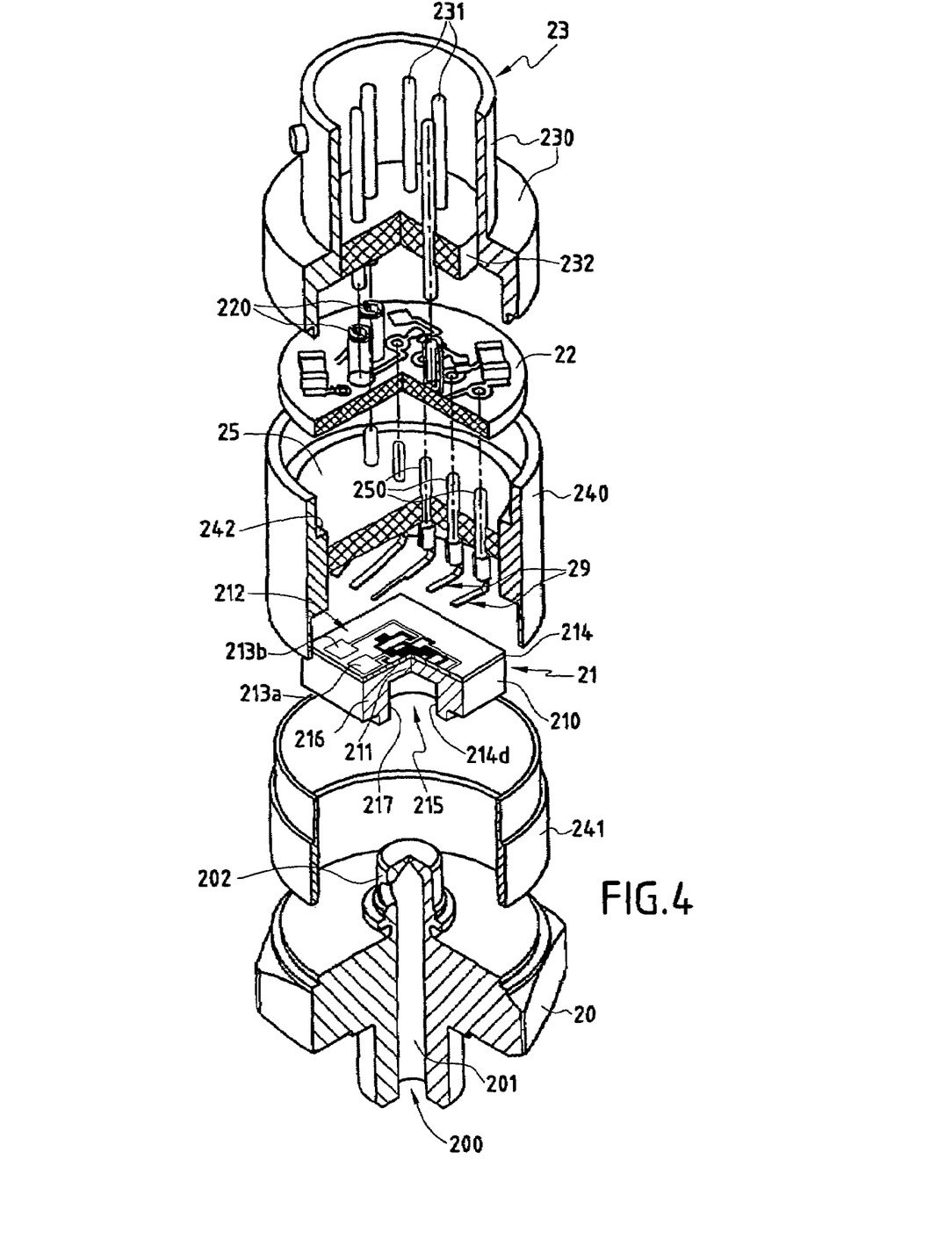
FIG. 4 is an exploded perspective view partially in section showing the pressure sensor constituting the first embodiment of the invention.

FIGS. 3 and 4 show a pressure sensor constituting a first embodiment of the invention.

This pressure sensor, given overall reference 2, comprises a pressure-takeoff body 20 having an opening 20a formed therein, a pressure detector element 21, a printed circuit 22, an electrical connector 23, a protective body 24, and a hermetically sealed and electrically insulating plate or bushing 25.

The opening 20a comprises a fluid inlet 200 and a duct 201 enabling a fluid whose pressure is to be measured to be taken from the fluid inlet 200 towards the pressure detector element 21.

The protective body 24 is constituted by a top portion 240 and a bottom portion 241 that are fixed together. The protective body 24 and the hermetically sealed plate 25 co-operate with the pressure-takeoff body 20 to define a first chamber 26 containing the pressure detector element 21, and together with the electrical connector 23, they also define a second chamber 27 housing the printed circuit 22. The printed circuit 22 is fixed on a ledge 242 provided in the inside wall of the top portion 240 of the protective body 24. The hermetically sealed plate 25 which is typically made of glass or ceramic, is also fixed to the inside wall of the top portion 240 of the protective body 24, and it isolates the first chamber 26 from the second chamber 27. In practice, the first chamber 26 is evacuated by conventional means.

As shown in FIG. 4, the electrical connector 23 is constituted by a body 230, an electrically insulating plate 232 fixed to the inside wall of the body 230, and conductive pins 231 parallel to the axis of the body 230 and passing through the insulating plate 232. The insulating plate 232 is made out of glass or ceramic, for example. The body 230 of the connector 23 is open on top to enable an electrical connection to be made with an appliance (not shown) for collecting data from the sensor, and its bottom end is fixed to the top portion 240 of the protective body 24. The conductive pins 231 are electrically connected at their bottom ends to the printed circuit 22 by engaging in connection sleeves 220.

The pressure-takeoff body 20, the protective body 24, and the body 230 of the connector 23 constitute the overall body of the sensor. Each of the bodies 20, 24, and 230 is typically made of metal. Connections between these elements can be made by welding, soldering, or adhesive.

The pressure detector element 21 is welded or soldered to the pressure-takeoff body 20, as shown in FIG. 3 under reference 28. The element 21 comprises a support piece 210, preferably a single piece, and a strain-gauge circuit or a deformation circuit 212 placed on the top face of the support piece 210, facing the hermetic sealing plate 25 and secured to said top face. The support piece 210 is generally in the form of a rectangular parallelepiped, having a recess 215 in its center (cf. FIG. 4). More particularly, the support piece 210 is constituted by a thin central portion 211 constituting the end wall of the recess 215 and acting as a flexible membrane, together with a periphery 216 that is thicker and rigid.

Figure 5:
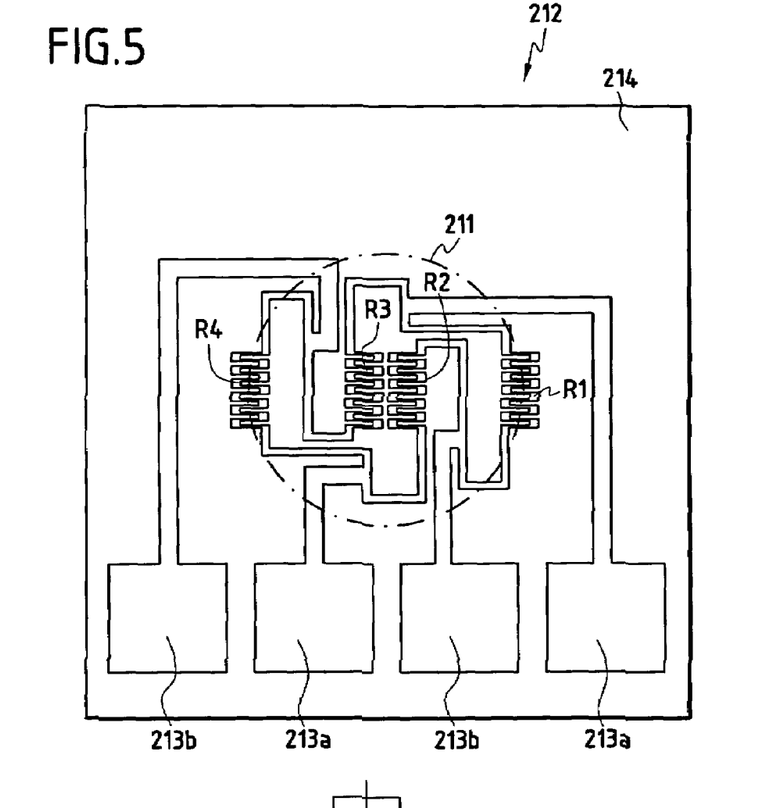
FIG. 5 shows a strain-gauge circuit used in the pressure sensor of the invention.

With reference to FIGS. 4 and 5, a strain-gauge circuit 212 comprises an electrically insulating thin substrate 214 made out of silica, for example, and on said substrate 214 four resistors R1 to R4 connected as a Wheatstone bridge, electrical contacts 213a serving as feed tabs of the circuit, and electrical contacts 213b serving as output tabs.

The circuit 212 is obtained by forming the thin insulating substrate 214 on the support piece 210, and subsequently using a sputtering technique to deposit a thin metal film 213, e.g. of the nichrome or gold type, having a thickness of a few angstroms (Å) on the thin insulating substrate 214, and then etching the metal film 213 in order to obtain the desired pattern.

The resistors R1 to R4 are situated on the membrane 211, or more precisely on a central portion of the substrate 214 formed on the membrane 211. In contrast, the electrical contacts 213a, 213b are located at a certain distance from the membrane 211 on the periphery 216 of the support 210, i.e. on a portion of the support 210 which, because of its rigid structure, is relatively insensitive to the pressure to be measured. As a result, when a fluid whose pressure is to be measured comes into contact with the bottom face of the membrane 211 via the duct 201, the Wheatstone bridge R1–R4 deforms together with the membrane 211, while the electrical contacts 213a, 213b remain stationary or almost stationary relative to the pressure-takeoff body 20. In practice, it has been found that a distance of 1 millimeter (mm) between the electrical contacts 213a, 213b, and the periphery of the membrane 211, for a membrane having a diameter of about 6 mm makes it possible to obtain decoupling between the elements R1–R4 and 213a–213b that is sufficient in terms of deformation.

The membrane 211, the central portion of the substrate 214 situated on the membrane 211, and the strain gauges R1–R4 constitute a "sensing" portion of the pressure detector element 21, i.e. a portion which is disturbed by the pressure that is to be measured. The periphery 216, the peripheral portion of the substrate 214 situated on the periphery 216, and the electrical contacts 213a, 213b constitute a "non-sensing" portion of the pressure detector element 21, or at least a portion that is relatively insensitive.

When the strain gauges R1–R4 are deformed under the effect of pressure received by the membrane 211, then the overall resistance of the Wheatstone bridge is changed. The resistance of the Wheatstone bridge is proportional to the difference between the pressure on the top surface of the strain-gauge circuit 212 (i.e. the zero pressure of the vacuum that obtains inside the chamber 26), and the pressure on the bottom surface of the membrane 211 (i.e. the pressure of the fluid to be measured). The output signal from the strain-gauge circuit 212 can be picked up in the form of a voltage between the electrical contacts 213b and it is proportional to said resistance and thus to the pressure of the fluid.

This output signal is corrected by the printed circuit 22 in conventional manner in order to compensate for offsets and drift due to manufacturing defects. For this purpose, the printed circuit 22 has passive resistors of resistances that are selected during a step of adjusting the sensor. A temperature compensation circuit may also optionally be provided on the printed circuit 22, in association with a temperature probe (not shown) on the pressure detector element 21, thus making it possible to compensate for the consequences of temperature variations in the strain-gauge circuit 212 during pressure measurement.

In accordance with the invention, the electrical connection between the strain-gauge circuit 212 and the printed circuit 22 serving in particular to allow the printed circuit 22 to power the strain-gauge circuit 212 and to receive a pressure detection signal therefrom, comprises electrically conducive flexible tongues 29 (only one of which is shown in FIG. 3).

Each flexible tongue 29 has a first end 290 in the form of a sleeve, and a second end 291. The first end 290 is connected to the second end 291 via, in succession: a bend 292; and a plane rectangular portion 293. The sleeve 290 is coupled at a first end to a corresponding conductive pin 250 which passes through the hermetically sealed plate 25 and which has a second end that is electrically connected to the printed circuit 22. The second end 291 of each flexible tongue 29 rests against a corresponding input tab 213a or output tab 213b of the strain-gauge circuit 212. No particular fixing means is provided such as welding, soldering, or adhesive in order to hold the second end 291 in contact with the corresponding input or output tab.

In order to make the electrical connection between the strain-gauge circuit 212 and the printed circuit 22 disconnectable, the sleeve 290 of each flexible tongue 29 may merely be engaged on said first end of the corresponding conductive pin 250 without using any other form of fixing such as welding, soldering, adhesive, or screw fastening.

In operation, the second end 291 of each tongue 29 remains in contact with the corresponding electrical contact 213a or 213b in spite of the deformation to which the membrane 211 is subjected because the electrical contact is positioned on a support which is relatively insensitive to the pressure that is to be measured and which therefore remains substantially stationary relative to the body 20, 24, 230. In addition, since the bearing force exerted by the tongues 29 is applied essentially to the rigid periphery 216, the membrane 211 is not subjected to any interfering force which might interfere with pressure measurement.

The flexibility of the tongues 29 serves to compensate for assembly tolerances and for thermal expansion differences between the various elements of the sensor.

In order to reduce any risk of long-term creep of the tongues 29, they are preferably dimensioned in such a manner that the bearing force they exert on the electrical contacts 213a, 213b is not too high.

The bearing faces of the tongues 29, referenced 294, are rounded, i.e. their corners are rounded, and they are polished, so as to improve electrical contact between said tongues 29 and the electrical contact tabs 213a, 213b.

In applications where the sensor as a whole is subjected to high levels of vibration, the tongues 29 are also designed to have a high resonant frequency, and in particular a resonant frequency that is higher than the excitation frequency(ies). Thus, for example when the sensor of the invention is used in a rocket engine, the flexible tongues preferably have a resonant frequency of not less than 12 kHz. The use of flexible tongues possessing a high resonant frequency serves to prevent the ends 291 which are not fixed to the electrical contact tabs 213a, 213b from moving relative to said tabs and for losing contact at their bearing points due to a resonant effect caused by external vibration acting on the sensor.

The tongues 29 of the invention are made of metal, preferably of beryllium-copper (Ube2). Beryllium-copper makes good electrical contact possible, and facilitates machining and forming the tongues during manufacture of the sensor. It also presents good mechanical characteristics.

Advantageously, other components of the sensor, such as the support piece 210 of the pressure detector element 21, the pressure-takeoff body 20, and the bottom portion 241 of the protective body 24 are also made of beryllium-copper. In general, it is highly advantageous for at least those portions of the sensor that are to come into contact with the fluid whose pressure is to be measured to be made of beryllium-copper. The top portion 240 of the protective body 24 and the body 230 of the electrical connector 23 are nevertheless preferably made of stainless steel since this metal is more suitable for the operations of bonding to the glass or the ceramic constituting the electrically insulating plates 25 and 232.

In this variant of the invention, the support piece 210 and the pressure-takeoff body 20, both made of beryllium-copper, can be fixed to each other by welding or by soldering. The same applies for fixing the pressure-takeoff body 20 to the bottom portion 241 of the protective body 24.

The connection between the bottom pressure 241 made of beryllium-copper and the top portion 240 made of stainless steel of the protective body 24 may be implemented by welding or by soldering, or by adhesive. An adhesive that is suitable for this purpose is constituted by the adhesive EP250 sold by the supplier HBM, for example.

By using beryllium-copper, the sensor of the invention can withstand extreme conditions of temperature and pressure, and in particular it can be placed in a cryogenic environment. In general, beryllium-copper presents good behavior in a temperature range extending from about −260° C. to about +150° C. and in a pressure range going up to about 500 bars.

In addition, unlike stainless steel as used in the prior art, beryllium-copper presents very good thermal conductivity, thereby reducing the risk of thermal shock, in particular in the sensing portion of the pressure detector element 21 when a fluid that is very cold or very hot penetrates into the sensor. In practice, it is important to avoid thermal shocks within the sensor as much as possible since they often have the effect of damaging certain components or of breaking connections between said components.

The very good thermal conductivity of beryllium-copper also guarantees that the strain gauges R1–R4 all remain at the same temperature after the cryogenic fluid has come into contact with the membrane 211, and consequently that pressure measurement will not be disturbed by undesirable temperature differences in the strain-gauge circuit 212. The use of beryllium-copper for making the pressure sensor 2 enables it to be positioned in or directly on a rocket engine that uses cryogenic fluid propellants, thus avoiding the need to make use of the complicated duct systems of the prior art for offsetting the sensor to outside the engine. In addition, beryllium-copper is not attacked by liquid oxygen and hydrogen and is therefore well adapted to the difficult conditions inside such a rocket engine.

Figure 6:
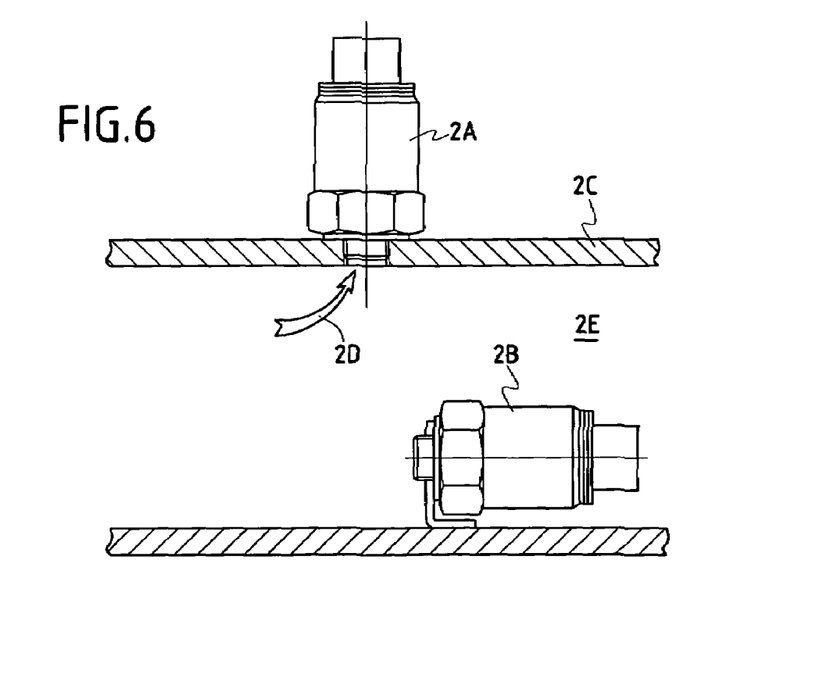
FIG. 6 comprises diagrams showing pressure sensors of the invention mounted on and in a rocket engine.

FIG. 6 is a diagram showing a portion of a rocket engine incorporating pressure sensors 2A and 2B of the type shown in FIGS. 3 and 4. The pressure sensor 2A is mounted directly on a wall 2C of the rocket engine so that the duct of the pressure-takeoff body passes right through said wall 2C. The pressure sensor 2A can thus receive one or more propellants (arrow 2D) traveling in a space 2E of the engine that is defined by the wall 2C. By way of example, the space 2E is a cryogenic propellant feed pipe or a cold portion of a servo-pump. The pressure sensor 2B is mounted inside the engine, i.e. inside the space 2E. Both sensors 2A and 2B receive propellants at cryogenic temperature.

With reference again to FIGS. 3 and 4, according to another characteristic of the pressure sensor 2, the pressure-takeoff body 20 and its duct 201 are arranged in such a manner as to direct the fluid whose pressure is to be measured essentially, and preferably solely, towards the inside surface of the rigid periphery 216, which inside surface is referenced 217.

As can be seen in FIG. 3, the pressure-takeoff body 20 has a projection 202 which penetrates into the recess 215 of the support piece 210, leaving a thin empty space 218 between the outside surface of the projection 202 and the inside surface of the recess 215. The empty space 218 puts the respective surfaces of the rigid perimeter 216 and the membrane 211 facing the projection 202 into communication with each other.

The duct 201 has a blind hole 203 which extends perpendicularly to the membrane 211 from the fluid inlet 200 into the projection 202. A second hole 204, parallel to the membrane 211, puts the closed end of the blind hole 203 into communication with the empty space 218, opening out into this empty space 218 in register with the inside surface 217 of the perimeter 216, and not in register with the membrane 211.

In operation, the fluid penetrates into the blind hole 203 via its open end which forms the fluid inlet 200, and then travels towards the empty space 218 via the second hole 204 so as to run over the inside surface of the recess 215 prior to being brought to rest in the vicinity of the join 28 connecting the pressure detector element 21 to the pressure-takeoff body 20.

This arrangement of the pressure-takeoff body 20 and its duct 201 acts as a temperature diffuser, preventing any sudden contact of the fluid on the membrane 211. The risk of thermal shock in the membrane is thus reduced since the fluid essentially comes into contact with the perimeter 216 prior to starting to deform the membrane 211. The temperature diffusion which takes place in the support piece 210 following the arrival of the fluid on the inside surface 216 of the periphery 216 enables the temperature difference between the membrane 211 and the fluid to be diminished before the fluid reaches the membrane 211.

The temperature diffuser 20, 201, 218 of the invention thus presents a particular advantage specifically when pressure sensors are situated in or directly on a rocket engine using cryogenic propellants, such as the sensors 2A and 2B shown in FIG. 6.

The fact of providing two distinct chambers 26 and 27 that are isolated by the hermetically sealed bushing 25 inside the embodiment of the pressure sensor 2 described above offers the advantage of making it possible during a prior stage of adjusting the sensor to implant the required electrical components on the printed circuit 22 with the pressure detector element 21 already subjected to vacuum pressure. Thus, during the adjustment stage, the pressure detector element 21, and more particularly the sensing portion constituted in particular by the membrane 211 and the strain gauges R1 to R4 is placed under the same pressure conditions as it will be placed during normal operation of the sensor, thus ensuring that adjustment can be performed effectively.

Figure 7:
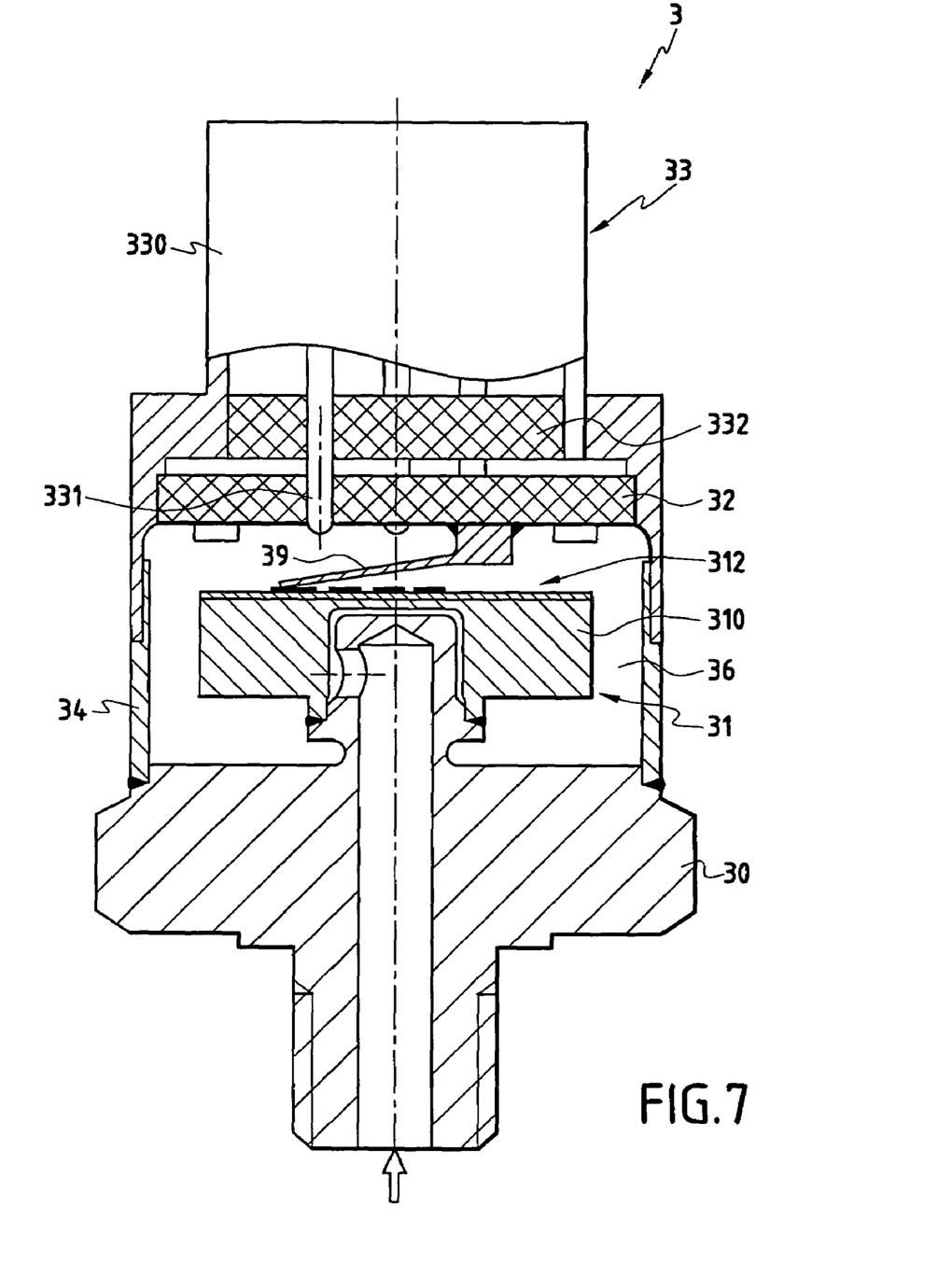
FIG. 7 shows a pressure sensor constituting a second embodiment of the invention.

FIG. 7 shows a pressure sensor constituting a second embodiment of the present invention.

The pressure sensor of FIG. 7, given reference 3, differs from the pressure sensor 2 shown in FIGS. 3 and 4 in particular in that the pressure detector element and the printed circuit are disposed in a common chamber, designated by reference 36.

The pressure detector element, the printed circuit, and the pressure-takeoff body, respectively designated by references 31, 32, and 30 are identical to the elements 21, 22, and 20 of the pressure sensor 2 shown in FIGS. 3 and 4.

The chamber 36 is defined by a protective body 34 formed as a single piece, an electrical connector 33, and the pressure-takeoff body 30. In practice, it is evacuated.

Like the electrical connector 23 in the first embodiment, the electrical connector 33 comprises a body 330, an electrically insulating plate 332, and connection pins 331 passing through the insulating plate 332. The insulating plate 332 serves as a hermetically sealed bushing so as to maintain a vacuum inside the chamber 36.

The printed circuit 32 is welded to the inside wall of an extension of the connector 33 fixed to the protective body 34. Unlike the pressure sensor 2, the electrical components of the printed circuit 32 are disposed on its inside face facing towards the pressure detector element 31.

The pressure detector element 31 and the printed circuit 32 are electrically connected to each other by one or more flexible conductive tongues 39 each having a first end which is fixed directly on the bottom face of the printed circuit 32, e.g. by welding or soldering, and a second end which merely bears against a corresponding electrical contact of a strain-gauge circuit 312 situated on a support piece 310 of the pressure detector element 31.

The flexible tongues 39, the support piece 310 of the pressure detector element 31, the pressure-takeoff body 30, and the protective body 34 are preferably made of beryllium-copper. The body 330 of the connector 33 may be made of stainless steel and may be welded or soldered onto the protective body 34 or it may be stuck thereon by adhesive. The support piece 310 and the protective body 34 may each be fixed to the pressure-takeoff body 30 by welding or by soldering. Similarly, the first ends of the flexible tongues 39 may be bonded to the printed circuit 32 by welding or by soldering.

This second embodiment constitutes a structure that is simpler than that of the first embodiment, and thus enables manufacturing costs to be reduced. It avoids the need to use a hermetically sealed bushing inside the sensor in order to isolate two chambers from each other.

In addition, since it is made up of a smaller number of parts than the first embodiment, the pressure sensor 3 is less disturbed by external vibration since there are fewer parts to be subjected to said vibration.

Nevertheless, given that the pressure sensor 3 has only one chamber, it is not possible to implement a stage of adjusting the sensor in the same manner as for the pressure sensor 2.

Figure 8:
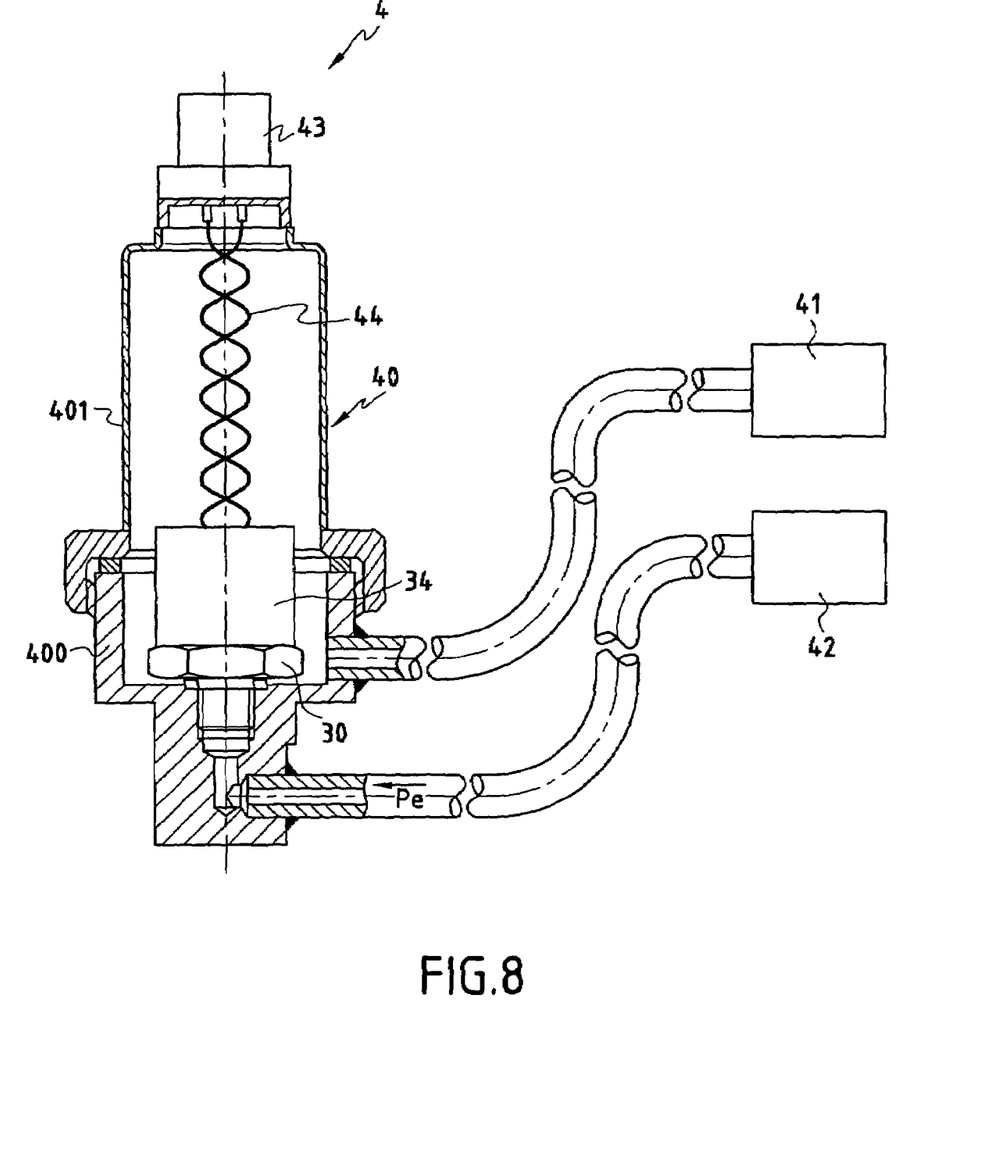
FIG. 8 shows a device for adjusting the pressure sensor in the second embodiment of the invention.

FIG. 8 shows a device 4 for adjusting the pressure sensor for use with this second embodiment of the invention. The adjustment device comprises firstly an enclosure 40 suitable for housing the sensor and secondly a vacuum pump 41 and a pressure generator 42 connected to the enclosure 40.

More precisely, the enclosure 40 has a bottom portion 400 for receiving a portion of the pressure sensor 3 and a top portion 401 secured to the bottom portion 400 and closed at its top end by an electrical connector 43 of the same type as the connector 33 of the pressure sensor 3.

The portion of the pressure sensor 3 that is inserted in the enclosure 40 essentially comprises the pressure-takeoff body 30, the pressure detector element 31 (not shown in FIG. 8) and the protective body 34. In other words, the adjustment stage is performed before the pressure sensor has been fully assembled, and in particular while it does not yet have its printed circuit and the electrical connector. The pressure detector element of the sensor portion is electrically connected to the electrical connector 43 that closes the enclosure 40 by means of removable conductive wires 44.

The adjustment device 4 is used as follows:

Using the vacuum pump 41, the air contained in the enclosure 40 is extracted so as to evacuate said enclosure. Thereafter, a test pressure Pe is applied to the duct of the pressure-takeoff body 30 in the sensor portion by means of the pressure generator 42. The conductive wires 44 transmit the electrical signal delivered by the pressure detector element 31 in response to applying the test pressure Pe, which electrical signal passes through the electrical connector 43 so as to be applied to an external electronic appliance (not shown) for collecting and analyzing the signal. As a function of the electrical signal received by the electronic appliance, the values of the passive components for installing on the printed circuit of the pressure sensor are determined in conventional manner. The sensor portion can then be extracted from the enclosure 40 and a printed circuit 32 having passive components with the above-determined values and an electrical connector 33 are then mounted on said portion of the sensor in order to finish off assembling it.

The two above-described embodiments of a pressure sensor are both absolute sensors. Nevertheless, the present invention is not limited to absolute sensors. By way of example, the second embodiment could be modified so that the chamber 36 common to the pressure detector element 31 and the printed circuit 32 is subjected to atmospheric pressure.

Flexible conductive tongues 29, 39 can be used for purposes other than powering the strain gauges and picking up the pressure detection signal, for example they could be used for gathering a strain gauge detection signal produced by a temperature probe on the pressure detector element 21, 31.

Nor is the invention limited to using any particular kind of strain gauge. Types of strain gauge other than the resistors R1 to R4 shown in FIG. 5 are known to the person skilled in the art.

It would also be clear to the person skilled in the art that the main characteristics of the pressure sensor of the invention, i.e. in particular the use of flexible conductive tongues 29, 39 for connecting together the pressure detector element 21, 31 and the printed circuit 22, 32, the use of beryllium-copper for making at least a portion of the sensor, and making an absolute pressure sensor having a single chamber 36 for housing the pressure detector element 31 and the printed circuit 32, can be implemented independently of one another. For example, a pressure sensor could be devised with a common chamber for the pressure detector element and the printed circuit, while using cabling of the same type as in the prior art for connecting the strain-gauge circuits on the pressure detector element to the printed circuit.

Although the invention is described in the context of a rocket engine, the person skilled in the art will also understand that the pressure sensor of the invention can be used for applications other than measuring the pressures of fluids flowing in a rocker engine.

What is claimed is:

1. A pressure sensor comprising a pressure detector element arranged to receive a pressure that is to be measured and to detect it, and a printed circuit connected to the pressure detector element by an electrical connection, the sensor being characterized in that said electrical connection comprises at least one flexible conductive tongue having a first end connected to the printed circuit and a second end merely bearing against a corresponding electrical contact of the pressure detector element, and in that the bearing face of said second end bearing against the corresponding electrical contact is polished.

2. A pressure sensor according to claim 1, characterized in that the or each electrical contact is positioned on the pressure detector element at a location which is relatively insensitive to the pressure that is to be measured.

3. A pressure sensor according to claim 1, characterized in that the pressure detector element comprises a membrane arranged to receive the pressure that is to be measured on a first face and to deflect under the effect of said pressure, and at least one strain gauge (R1–R4) which is situated on a second face of the membrane opposite from the first face so as to deflect with the membrane under the effect of said pressure and which is connected to the or each electrical contact.

4. A pressure sensor according to claim 2, characterized in that the pressure detector element comprises a support having a thin central portion constituting the membrane, and a rigid periphery, and in that the or each electrical contact is disposed on the rigid periphery at a sufficient distance from the membrane to be relatively insensitive to the pressure that is to be measured.

5. A pressure sensor according to claim 1, characterized in that the first end of the or each flexible conductive tongue is engaged on a first end of a corresponding conductive pin having a second end connected to the printed circuit.

6. A pressure sensor according to claim 1, characterized in that it has an evacuated first chamber in which the pressure detector element is disposed, and a second chamber containing the printed circuit, and in that it further comprises a hermetically sealed plate between the first and second chambers and at least one conductive element passing through the hermetically sealed plate and connected at a first end to the or one of the flexible conductive tongues, and at a second end to the printed circuit.

7. A pressure sensor according to claim 6, characterized in that the or each conductive element is in the form of a conductive pin, and in that the first end of the or each flexible conductive tongue is engaged on the first end of the conductive element.

8. A pressure sensor according to claim 1, characterized in that the pressure detector element and the printed circuit are disposed in a common chamber inside the pressure sensor.

9. A pressure sensor according to claim 8, characterized in that the first end of the or each flexible conductive tongue is fixed directly to the printed circuit.

10. A pressure sensor according to claim 8, characterized in that said common chamber is evacuated.

11. A pressure sensor according to claim 8, characterized in that the electrical component(s) of the printed circuit is/are situated on a face facing the pressure detector element.

12. A pressure sensor according to claim 1, characterized in that it includes an electrical connector enabling an electrical appliance to be connected to the pressure sensor.

13. A pressure sensor according to claim 12, characterized in that the electrical connector includes at least one conductive pin having one end connected to the printed circuit by engaging in a corresponding connection sleeve.

14. A pressure sensor according to claim 1, characterized in that it comprises a body in which the pressure detector element and the printed circuit are fixed, said body having an opening enabling a fluid whose pressure is to be measured to penetrate into the pressure sensor.

15. A pressure sensor according to claim 14, characterized in that the opening includes a duct arranged to direct the fluid essentially towards a surface of the rigid periphery of the pressure detector element, an empty space being provided between a surface of the body and the pressure detector element to enable the fluid subsequently to come into contact with the membrane.

16. A pressure sensor according to claim 15, characterized in that the body includes a projection entering into a recess of the pressure detector element defined by the rigid periphery and the membrane, and the duct includes a first hole having an open end for receiving the fluid, and a closed end, and a second hole communicating with the first hole at or in the vicinity of the closed end thereof and making an angle with the first hole, the second hole being formed at least in part in the projection and opening out into the empty space essentially towards said surface of the rigid periphery of the pressure detector element.

17. A pressure sensor according to claim 3, characterized in that the pressure detector element comprises four strain gauges (R1–R4) mounted in a Wheatstone bridge, and said electrical connection comprises two flexible conductive tongues serving to transmit an electrical power supply signal to the strain gauges (R1–R4) from the printed circuit and two other flexible conductive tongues serving to transmit an electrical output signal from the strain gauges (R1–R4) to the printed circuit.

18. A pressure sensor according to claim 1, characterized in that the or each flexible conductive tongue is made of beryllium-copper.

19. A pressure sensor according to claim 3, characterized in that the membrane of the pressure detector element is made of beryllium-copper.

20. A pressure sensor according to claim 4, characterized in that the support of the pressure detector element is made of beryllium-copper.

21. A pressure sensor according to claim 20, characterized in that the pressure detector element comprises an insulating substrate on the support, which insulating substrate supports the strain gauge(s) (R1–R4) and the electrical contact(s).

22. A pressure sensor according to claim 14, characterized in that at least a portion of the body for coming into contact with the fluid is made of beryllium-copper.

23. A pressure sensor according to claim 22, characterized in that the body comprises a pressure-takeoff body having the pressure detector element fixed thereon and including said opening, and in that the pressure-takeoff body is made of beryllium-copper.

24. The use of a pressure sensor according to claim 19 to measure the pressure of a cryogenic fluid.

25. A use according to claim 24, characterized in that said fluid is at a cryogenic temperature when received by the pressure sensor.

26. A use according to claim 24, characterized in that the pressure sensor (2A, 2B) is mounted inside (2E) a rocket engine or directly on a wall (2C) of the rocket engine, and serves to measure the pressure of at least one cryogenic fluid propellant used by the rocket engine, such as liquid oxygen or liquid hydrogen.

27. A pressure sensor according to claim 2, characterized in that the pressure detector element comprises a membrane arranged to receive the pressure that is to be measured on a first face and to deflect under the effect of said pressure, and at least one strain gauge (R1–R4) which is situated on a second face of the membrane opposite from the first face so as to deflect with the membrane under the effect of said pressure and which is connected to the or each electrical contact.

28. A pressure sensor according to claim 2, characterized in that:
   the pressure detector element comprises a membrane arranged to receive the pressure that is to be measured on a first face and to deflect under the effect of said pressure, and at least one strain gauge (R1–R4) which is situated on a second face of the membrane opposite from the first face so as to deflect with the membrane under the effect of said pressure and which is connected to the or each electrical contact;
   the pressure detector element comprises a support having a thin central portion constituting the membrane, and a rigid periphery, and in that the or each electrical contact is disposed on the rigid periphery at a sufficient distance from the membrane to be relatively insensitive to the pressure that is to be measured;
   it has an evacuated first chamber in which the pressure detector element is disposed, and a second chamber containing the printed circuit, and in that it further comprises a hermetically sealed plate between the first and second chambers and at least one conductive element passing through the hermetically sealed plate and connected at a first end to the or one of the flexible conductive tongues, and at a second end to the printed circuit;
   the or each conductive element is in the form of a conductive pin, and in that the first end of the or each flexible conductive tongue is engaged on the first end of the conductive element;
   the first end of the or each flexible conductive tongue is fixed directly to the printed circuit;
   said common chamber is evacuated;
   the electrical component(s) of the printed circuit is/are situated on a face facing the pressure detector element;
   it includes an electrical connector enabling an electrical appliance to be connected to the pressure sensor;
   the electrical connector includes at least one conductive pin having one end connected to the printed circuit by engaging in a corresponding connection sleeve;
   it comprises a body in which the pressure detector element and the printed circuit are fixed, said body having an opening enabling a fluid whose pressure is to be measured to penetrate into the pressure sensor;

the opening includes a duct arranged to direct the fluid essentially towards a surface of the rigid periphery of the pressure detector element, an empty space being provided between a surface of the body and the pressure detector element to enable the fluid subsequently to come into contact with the membrane;

the body includes a projection entering into a recess of the pressure detector element defined by the rigid periphery and the membrane, and the duct includes a first hole having an open end for receiving the fluid, and a closed end, and a second hole communicating with the first hole at or in the vicinity of the closed end thereof and making an angle with the first hole, the second hole being formed at least in part in the projection and opening out into the empty space essentially towards said surface of the rigid periphery of the pressure detector element;

the pressure detector element comprises four strain gauges (R1–R4) mounted in a Wheatstone bridge, and said electrical connection comprises two flexible conductive tongues serving to transmit an electrical power supply signal to the strain gauges (R1–R4) from the printed circuit and two other flexible conductive tongues serving to transmit an electrical output signal from the strain gauges (R1–R4) to the printed circuit;

the or each flexible conductive tongue is made of beryllium-copper;

the membrane of the pressure detector element is made of beryllium-copper;

the support of the pressure detector element is made of beryllium-copper;

the pressure detector element comprises an insulating substrate on the support, which insulating substrate supports the strain gauge(s) (R1–R4) and the electrical contact(s);

at least a portion of the body for corning into contact with the fluid is made of beryllium-copper;

the body comprises a pressure-takeoff body having the pressure detector element fixed thereon and including said opening, and in that the pressure-takeoff body is made of beryllium-copper.

29. A pressure sensor according to claim 4, characterized in that:

the first end of the or each flexible conductive tongue is engaged on a first end of a corresponding conductive pin having a second end connected to the printed circuit;

the pressure detector element and the printed circuit are disposed in a common chamber inside the pressure sensor;

the first end of the or each flexible conductive tongue is fixed directly to the printed circuit;

said common chamber is evacuated;

the electrical component(s) of the printed circuit is/are situated on a face facing the pressure detector element;

it includes an electrical connector enabling an electrical appliance to be connected to the pressure sensor;

the electrical connector includes at least one conductive pin having one end connected to the printed circuit by engaging in a corresponding connection sleeve;

it comprises a body in which the pressure detector element and the printed circuit are fixed, said body having an opening enabling a fluid whose pressure is to be measured to penetrate into the pressure sensor;

the opening includes a duct arranged to direct the fluid essentially towards a surface of the rigid periphery of the pressure detector element, an empty space being provided between a surface of the body and the pressure detector element to enable the fluid subsequently to come into contact with the membrane;

the body includes a projection entering into a recess of the pressure detector element defined by the rigid periphery and the membrane, and the duct includes a first hole having an open end for receiving the fluid, and a closed end, and a second hole communicating with the first hole at or in the vicinity of the closed end thereof and making an angle with the first hole, the second hole being formed at least in part in the projection and opening out into the empty space essentially towards said surface of the rigid periphery of the pressure detector element;

the pressure detector element comprises four strain gauges (R1–R4) mounted in a Wheatstone bridge, and said electrical connection comprises two flexible conductive tongues serving to transmit an electrical power supply signal to the strain gauges (R1–R4) from the printed circuit and two other flexible conductive tongues serving to transmit an electrical output signal from the strain gauges (R1–R4) to the printed circuit;

the or each flexible conductive tongue is made of beryllium-copper;

the membrane of the pressure detector element is made of beryllium-copper;

the support of the pressure detector element is made of beryllium-copper;

the pressure detector element comprises an insulating substrate on the support, which insulating substrate supports the strain gauge(s) (R1–R4) and the electrical contact(s);

at least a portion of the body for coming into contact with the fluid is made of beryllium-copper;

the body comprises a pressure-takeoff body having the pressure detector element fixed thereon and including said opening, and in that the pressure-takeoff body is made of beryllium-copper.

30. The use of a pressure sensor according to claim 28 to measure the pressure of a cryogenic fluid;

said fluid is at a cryogenic temperature when received by the pressure sensor;

the pressure sensor (2A, 2B) is mounted inside (2E) a rocket engine or directly on a wall (2C) of the rocket engine, and serves to measure the pressure of at least one cryogenic fluid propellant used by the rocket engine, such as liquid oxygen or liquid hydrogen.

31. The use of a pressure sensor according to claim 29 to measure the pressure of a cryogenic fluid;

said fluid is at a cryogenic temperature when received by the pressure sensor;

the pressure sensor (2A, 2B) is mounted inside (2E) a rocket engine or directly on a wall (2C) of the rocket engine, and serves to measure the pressure of at least one cryogenic fluid propellant used by the rocket engine, such as liquid oxygen or liquid hydrogen.

32. A pressure sensor characterized in that it comprises:

a membrane arranged to receive a fluid of pressure that is to be measured on a first face, and to deflect under the effect of said pressure; and at least one strain gauge (R1–R4) disposed on a second face of the membrane, opposite from the first face, so as to deflect with the membrane under the effect of said pressure;

and in that the membrane is made of beryllium-copper;

a support comprising a thin central portion and a rigid periphery, the thin central portion acting as a membrane arranged to receive a fluid of pressure that is to be measured on one of its faces, and to deflect under the effect of said pressure; and a strain-gauge circuit disposed on the support in such a manner that at least one strain gauge (R1–R4) of the strain-gauge circuit is deformed with the membrane under the effect of said pressure;

and in that the support is made of beryllium-copper;

the strain-gauge circuit having an insulating substrate disposed on the support and itself supporting one or more strain gauges;

a pressure-takeoff body secured to the support and in which a duct is formed suitable for receiving the fluid and for directing the fluid towards the support, and in that the pressure-takeoff body is made of beryllium-copper;

a body inside which there are disposed the support and the strain-gauge circuit, the body having an opening allowing the fluid to enter into the pressure sensor, and in that at least a portion of the body for coming into contact with the fluid is made of beryllium-copper;

it further comprises fluid feed means for bringing the fluid having pressure that is to be measured towards the support, the fluid feed means being arranged to direct the fluid essentially towards a surface of the rigid periphery, and communication means making said surface of the rigid periphery communicate with said face of the membrane in order to enable the fluid subsequently to come into contact with said face of the membrane;

the fluid feed means comprises a pressure-takeoff body to which the support is secured and in which there is formed a duct suitable for receiving the fluid and for directing it towards said surface of the rigid periphery;

the pressure-takeoff body is made of beryllium-copper;

the communication means includes an empty space situated between the support and the fluid feed means;

the pressure-takeoff body has a projection entering into a recess of the support defined by the rigid periphery and the membrane, and the duct comprises a first hole having an open end for receiving the fluid and a closed end, and a second hole communicating with the first hole at or in the vicinity of the closed end thereof and making an angle with the first hole, the second hole being formed at least in part in the projection and opening out into the empty space essentially towards said surface of the rigid periphery of the support.

33. A pressure sensor characterized in that it comprises:
a support comprising a thin central portion and a rigid periphery, the thin central portion acting as a membrane arranged to receive a fluid of pressure that is to be measured on one of its faces, and to deflect under the effect of said pressure; and a strain-gauge circuit disposed on the support in such a manner that at least one strain gauge (R1–R4) of the strain-gauge circuit is deformed with the membrane under the effect of said pressure;

the strain-gauge circuit further comprises an insulating substrate disposed on the support and itself supporting one or more strain gauges; and a pressure-takeoff body secured to the support and in which a duct is formed suitable for receiving the fluid and for directing the fluid towards the support, and in that the pressure-takeoff body is made of beryllium-copper.

34. A pressure sensor characterized in that it comprises:
a support comprising a thin central portion and a rigid periphery, the thin central portion acting as a membrane arranged to receive a fluid of pressure that is to be measured on one of its faces, and to deflect under the effect of said pressure; and a strain-gauge circuit disposed on the support in such a manner that at least one strain gauge (R1–R4) of the strain-gauge circuit is deformed with the membrane under the effect of said pressure;

the strain-gauge circuit further comprises an insulating substrate disposed on the support and itself supporting one or more strain gauges; and a body inside which there are disposed the support and the strain-gauge circuit, the body having an opening allowing the fluid to enter into the pressure sensor, and in that at least a portion of the body for coming into contact with the fluid is made of beryllium-copper.

35. A pressure sensor characterized in that it comprises:
a support comprising a thin central portion and a rigid periphery, the thin central portion acting as a membrane arranged to receive a fluid of pressure that is to be measured on one of its faces, and to deflect under the effect of said pressure; and a strain-gauge circuit disposed on the support in such a manner that at least one strain gauge (R1–R4) of the strain-gauge circuit is deformed with the membrane under the effect of said pressure;

the strain-gauge circuit further comprises an insulating substrate disposed on the support and itself supporting one or more strain gauges; and fluid feed means for bringing the fluid having pressure that is to be measured towards the support, the fluid feed means being arranged to direct the fluid essentially towards a surface of the rigid periphery, and communication means making said surface of the rigid periphery communicate with said face of the membrane in order to enable the fluid subsequently to come into contact with said face of the membrane.

36. A pressure sensor characterized in that it comprises:
a support comprising a thin central portion and a rigid periphery, the thin central portion acting as a membrane arranged to receive a fluid of pressure that is to be measured on one of its faces, and to deflect under the effect of said pressure; and a strain-gauge circuit disposed on the support in such a manner that at least one strain gauge (R1–R4) of the strain-gauge circuit is deformed with the membrane under the effect of said pressure;

fluid feed means for bringing the fluid having pressure that is to be measured towards the support, the fluid feed means being arranged to direct the fluid essentially towards a surface of the rigid periphery, and communication means making said surface of the rigid periphery communicate with said face of the membrane in order to enable the fluid subsequently to come into contact with said face of the membrane;

the fluid feed means comprises a pressure-takeoff body to which the support is secured and in which there is formed a duct suitable for receiving the fluid and for directing it towards said surface of the rigid periphery; and the communication means includes an empty space situated between the support and the fluid feed means.

37. A pressure sensor characterized in that it comprises:
a support comprising a thin central portion and a rigid periphery, the thin central portion acting as a membrane arranged to receive a fluid of pressure that is to be measured on one of its faces, and to deflect under the effect of said pressure; and a strain-gauge circuit disposed on the support in such a manner that at least one strain gauge (R1–R4) of the strain-gauge circuit is deformed with the membrane under the effect of said pressure;

fluid feed means for bringing the fluid having pressure that is to be measured towards the support, the fluid feed means being arranged to direct the fluid essentially towards a surface of the rigid periphery, and communication means making said surface of the rigid periphery communicate with said face of the membrane in order to enable the fluid subsequently to come into contact with said face of the membrane;

the fluid feed means comprises a pressure-takeoff body to which the support is secured and in which there is formed a duct suitable for receiving the fluid and for directing it towards said surface of the rigid periphery;

wherein the pressure-takeoff body is made of beryllium-copper; and the communication means includes an empty space situated between the support and the fluid feed means.

38. A pressure sensor characterized in that:

a support comprising a thin central portion and a rigid periphery, the thin central portion acting as a membrane arranged to receive a fluid of pressure that is to be measured on one of its faces, and to deflect under the effect of said pressure; and a strain-gauge circuit disposed on the support in such a manner that at least one strain gauge (R1–R4) of the strain-gauge circuit is deformed with the membrane under the effect of said pressure;

fluid feed means for bringing the fluid having pressure that is to be measured towards the support, the fluid feed means being arranged to direct the fluid essentially towards a surface of the rigid periphery, and communication means making said surface of the rigid periphery communicate with said face of the membrane in order to enable the fluid subsequently to come into contact with said face of the membrane;

the fluid feed means comprises a pressure-takeoff body to which the support is secured and in which there is formed a duct suitable for receiving the fluid and for directing it towards said surface of the rigid periphery the fluid feed means comprises a pressure-takeoff body to which the support is secured and in which there is formed a duct suitable for receiving the fluid and for directing it towards said surface of the rigid periphery;

the communication means includes an empty space situated between the support and the fluid feed means;

the pressure-takeoff body has a projection entering into a recess of the support defined by the rigid periphery and the membrane, and the duct comprises a first hole having an open end for receiving the fluid and a closed end, and a second hole communicating with the first hole at or in the vicinity of the closed end thereof and making an angle with the first hole, the second hole being toned at least in part in the projection and opening out into the empty space essentially towards said surface of the rigid periphery of the support.

* * * * *

UNITED STATES PATENT AND TRADEMARK OFFICE
CERTIFICATE OF CORRECTION

PATENT NO. : 6,986,285 B2
APPLICATION NO. : 10/466563
DATED : January 17, 2006
INVENTOR(S) : Jean-Bernard Avisse Page 1 of 1

It is certified that error appears in the above-identified patent and that said Letters Patent is hereby corrected as shown below:

Column 22, line 26, claim 38, "toned" should read --formed--.

Signed and Sealed this

Eighth Day of August, 2006

JON W. DUDAS
*Director of the United States Patent and Trademark Office*